US010324769B2

(12) United States Patent
Aghasaryan et al.

(10) Patent No.: US 10,324,769 B2
(45) Date of Patent: Jun. 18, 2019

(54) CONTROLLING THE PROCESSING OF A MULTIMEDIA OBJECT BY A SOFTWARE APPLICATION

(75) Inventors: Armen Aghasaryan, Nozay (FR); Guy-Bertrand Kamga, Nozay (FR); Makram Bouzid, Nozay (FR); Marie-Pascale Dupont, Nozay (FR)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 14/124,453

(22) PCT Filed: Jun. 7, 2012

(86) PCT No.: PCT/EP2012/060803
§ 371 (c)(1),
(2), (4) Date: Feb. 28, 2014

(87) PCT Pub. No.: WO2012/168367
PCT Pub. Date: Dec. 13, 2012

(65) Prior Publication Data
US 2014/0201764 A1   Jul. 17, 2014

(30) Foreign Application Priority Data

Jun. 8, 2011 (FR) ..................................... 11 54983

(51) Int. Cl.
*G06F 3/00* (2006.01)
*G06F 9/44* (2018.01)
(Continued)
(52) U.S. Cl.
CPC ................ *G06F 9/54* (2013.01); *G06F 16/40* (2019.01); *G06F 16/435* (2019.01); *G06F 16/438* (2019.01)
(58) Field of Classification Search
CPC ....................................................... G06F 9/54
(Continued)

(56) References Cited

U.S. PATENT DOCUMENTS 7,293,017 B2    11/2007  Hurst-Hiller et al.
8,590,002 B1 *  11/2013  Chebiyyam ......... H04L 63/0245
                                                        380/200
(Continued)

FOREIGN PATENT DOCUMENTS

CN    101404650 A    4/2009
CN    101547117 A    9/2009
(Continued)

OTHER PUBLICATIONS

International Search Report for PCT/EP2012/060803 dated Jul. 19, 2012.

*Primary Examiner* — Timothy A Mudrick
(74) *Attorney, Agent, or Firm* — Fay Sharpe LLP

(57) ABSTRACT

To control the processing of a multimedia object (OM) by a software application (AppL) implemented within a communication device (DC), a control application (AC) implemented in the communication device intercepts a call from the software application to an execution environment (EE) to carry out a basic operation on the multimedia object, the multimedia object being divided into segments each associated with control data (DonC) comprising at least some data from among semantic data (DonSm), sensitivity data (DonSb), and functionality data (DonF), associates transformation parameters (ParT) comprising at least one functionality parameter (ParF) and at least one semantic parameter (ParSm) and one sensitivity parameter (ParSb) with the call, depending upon the context in which the call is executed. The control application transforms the multimedia object into a transformed multimedia object (OMt) based on the control data (DonC) associated with the multimedia object and the transformation parameters (ParT) associated with the call, the transformed multimedia object comprising at least one transformed segment such that the transformed multimedia object presents less information than the multi- (Continued)

Figure 1:
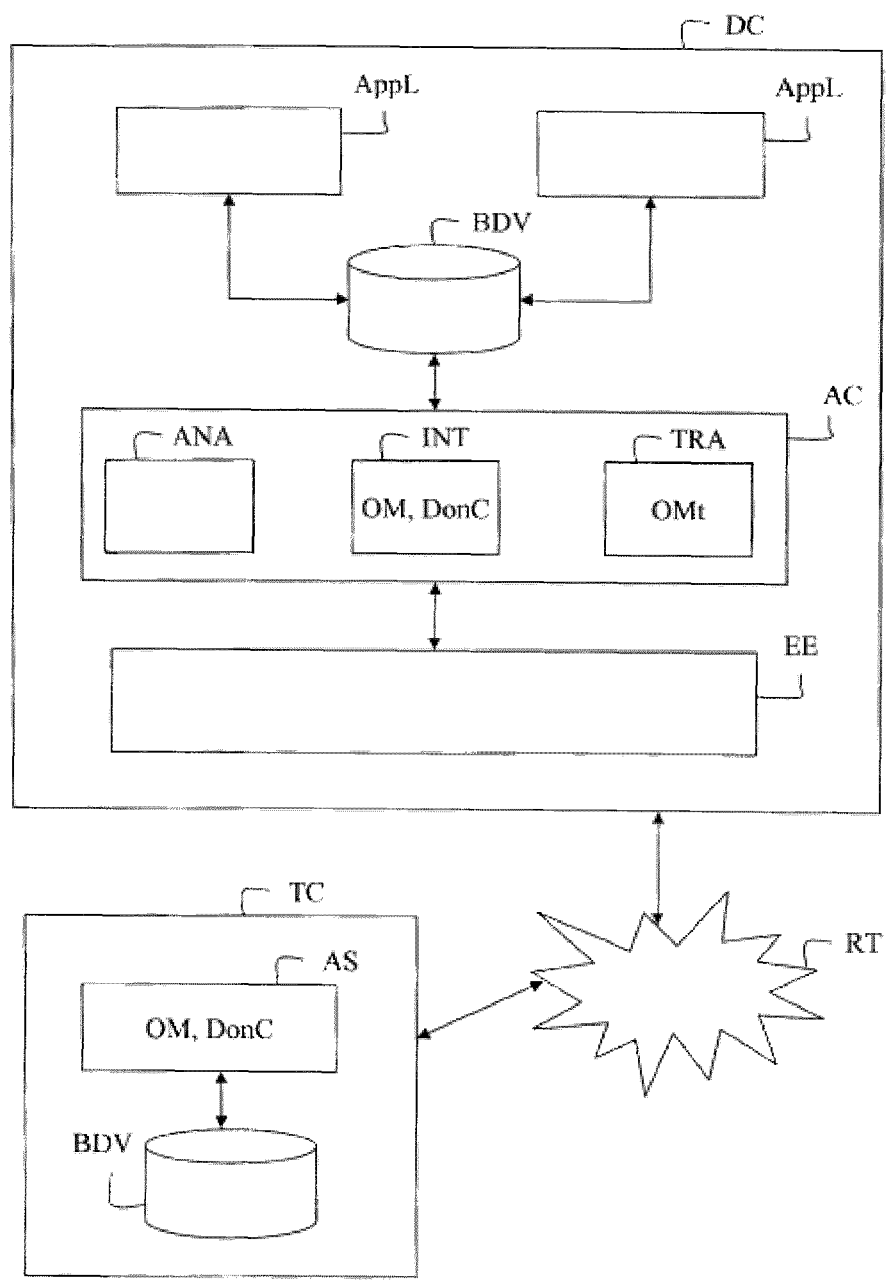

media object and is capable of undergoing a basic operation carried out by the execution environment.

18 Claims, 2 Drawing Sheets

(51) Int. Cl.
    *G06F 9/46*         (2006.01)
    *G06F 13/00*       (2006.01)
    *G06F 9/54*         (2006.01)
    *G06F 16/435*     (2019.01)
    *G06F 16/438*     (2019.01)
    *G06F 16/40*      (2019.01)

(58) Field of Classification Search
    USPC .......................................................... 719/320
    See application file for complete search history.

(56) References Cited

U.S. PATENT DOCUMENTS

| | | |
|---|---|---|
| 2003/0012399 A1 | 1/2003 | Wu |
| 2005/0050355 A1 | 3/2005 | Graunke |
| 2008/0282337 A1* | 11/2008 | Crawford ........................ 726/12 |
| 2009/0007245 A1* | 1/2009 | Schultz ............................. 726/5 |
| 2009/0128573 A1* | 5/2009 | Lambe et al. ................. 345/530 |

FOREIGN PATENT DOCUMENTS

| | | |
|---|---|---|
| CN | 101789942 A | 7/2010 |
| WO | WO 2006/126097 A2 | 11/2006 |

* cited by examiner

CONTROLLING THE PROCESSING OF A MULTIMEDIA OBJECT BY A SOFTWARE APPLICATION

This invention pertains to a system for controlling the processing of a multimedia object by a software application.

Currently, mechanisms for protecting user privacy have the functionality of preventing the disclosure of private content according to various conditions, for example based on the person accessing the content, or based on the intended usage of the content.

Decisions about the disclosure of content are taken only in relation to all of the initially created content, without considering the complexity of the content, which might contain different parts that are more or less sensitive.

To resolve the previous disadvantages, a method for controlling the processing of a multimedia object by a software application implemented within a communication device comprises the following steps in a control application implemented within the communication device:

Intercepting a call from the software application to an execution environment to carry out a basic operation on the multimedia object, the multimedia object being divided into segments, each associated with control data comprising at least data from among semantic data, sensitivity data, and functionality data, Associating transformation parameters comprising at least one functionality parameter and at least one semantic parameter and one sensitivity parameter with the call, based on the execution context of the call, Transforming the multimedia object into a transformed multimedia object based on the control data associated with the multimedia object and the transformation parameters associated with the call, the transformed multimedia object comprising at least one transformed segment such that the transformed multimedia object presents less information than the multimedia object and is capable of undergoing a basic operation carried out by the execution environment.

Advantageously, the invention guarantees the application of desired privacy protections for a multimedia object defined by the user who created said multimedia object, when another user attempts to access the multimedia object by invoking a basic operation on the multimedia object through the intermediary of a software application.

According to another characteristic of the invention, the semantic data, sensitivity data, and functionality data might define respectively the meaning of a segment, the level of sensitivity of a segment, and possible actions for the segment, and the semantic parameter, sensitivity parameter, and functionality parameter might describe respectively a meaning related to the multimedia object, a level of sensitivity related to the multimedia object, and an action requested for the multimedia object.

According to another characteristic of the invention, the execution context of the call by the software application may be determined based on the type of basic operation requested by the software application.

According to another characteristic of the invention, the execution context of the call by the software application may also be determined based on at least one element from among the elements comprising the name of the software application, the type of software application, the type of execution environment, and the identity of the user of the software application.

According to another characteristic of the invention, the transformed multimedia object comprises at least one transformed segment that is selected when it is associated with control data compatible with the transformation parameters.

According to another characteristic of the invention, the transformed multimedia object may comprise at least one segment that is deleted or blurred.

According to another characteristic of the invention, a basic operation on the multimedia object is an operation carried out by an API (Application Programming Interface).

According to another characteristic of the invention, a basic operation on the multimedia object is an operation from a set comprising at least read, copy, paste, drag, edit, open, and print operations.

According to another characteristic of the invention, the execution environment may be an operating system.

The invention also pertains to a communication device to control the processing of a multimedia object by a software application implemented within the communication device, comprising:

The means to intercept a call from the software application to an execution environment to carry out a basic operation on the multimedia object, the multimedia object being divided into segments, each associated with control data comprising at least data from among semantic data, sensitivity data, and functionality data, The means to associate transformation parameters comprising at least one functionality parameter and at least one semantic parameter and one sensitivity parameter with the call, based on the execution context of the call, The means to transform the multimedia object into a transformed multimedia object based on the control data associated with the multimedia object and the transformation parameters associated with the call, the transformed multimedia object comprising at least one transformed segment such that the transformed multimedia object presents less information than the multimedia object and is capable of undergoing a basic operation carried out by the execution environment.

The invention also pertains to a computer program capable of being implemented within a device, said program comprising instructions which, whenever the program is executed within said device, carry out the steps according to the inventive method.

Figure 2:
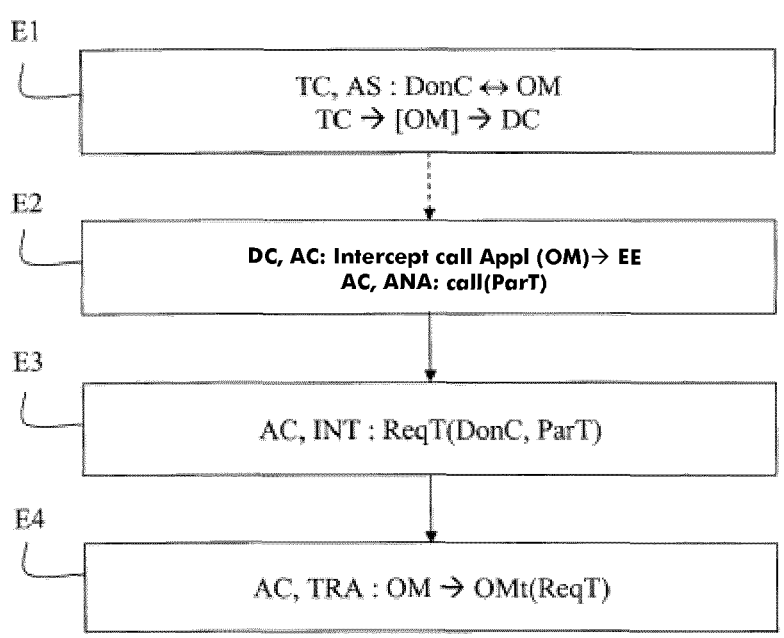

The present invention and the benefits thereof shall be better understood upon examining the description below, which makes reference to the attached figures, in which:

FIG. 1 is a schematic block diagram of a communication system according to one embodiment of the invention, and FIG. 2 is an algorithm of a method for controlling the processing of a multimedia object by a software application according to one embodiment of the invention.

With reference to FIG. 1, a communication system comprises a communication device DC and at least one communication terminal TC, capable of communicating with one another through a telecommunication network RT.

The telecommunication network RT may be a wired or wireless network, or a combination of wired and wireless networks.

In one example, the telecommunication network RT is a high-speed IP ("Internet Protocol") packet network, such as the Internet or an intranet.

In another example, the telecommunication network RT is a TDM ("Time Division Multiplexing") network or a private network specific to a company supporting a proprietary protocol.

A communication terminal TC is capable of communicating over the telecommunication network RT with the communication device DC, and in particular of sending a multimedia object OM to the device.

In one example, a communication terminal is a personal computer directly linked by modem to an xDSL ("Digital Subscriber Line") or ISDN ("Integrated Services Digital Network") link connected to the telecommunication network RT.

In another example, a communication terminal is a mobile cellular radiocommunication terminal, linked to the telecommunication network by a radiocommunication channel, for example of the GSM ("Global System for Mobile communications") or UMTS ("Universal Mobile Telecommunications System") type.

In another example, a communication terminal comprises an electronic telecommunication device or object that may be a personal digital assistant (PDA) or a smartphone, capable of being connected to an antenna on a public wireless local area network WLAN, a network using the 802.1x standard, or a wide area network using the WIMAX ("World wide Interoperability Microwave Access") protocol, connected to the telecommunication network.

The communication terminal TC comprises a segmentation application AS to segment a multimedia object OM. A multimedia object OM is for example, an image or a file with text, and/or audio, and/or video content.

The segmentation application AS associates control data DonC with a multimedia object OM. The control data DonC are for example metadata.

More specifically, the segmentation application AS segments a multimedia object OM into several parts, automatically, semi-automatically or manually at the initiative of the user who created the multimedia object or is its owner.

The segmentation application AS communicates with a vocabulary database BDV that contains definitions and user guides for the control data DonC, and distinguishes these data into at least three categories:

Semantic data DonSm defining the meaning of a segment of a multimedia object,

Sensitivity data DonSb defining the level of sensitivity of a segment of a multimedia object, and Functionality data DonF defining the actions possible for a segment of a multimedia object.

Semantic data DonSm indicate for example a personal relationship, a political vision, or a religious affiliation.

Sensitivity data DonSb indicate the level of sensitivity of a segment of a multimedia object, for example in the form of a score that can be assigned based on a graduated scale, or in the form of information from among information of the types "low", "medium", and "high".

Functionality data DonF indicate for example actions such as "delete", "make anonymous", or "blur".

Control data DonC may be associated with the multimedia object, for example, in the form of various labels assigned respectively to different segments of the multimedia object.

The control data DonC may also contain sets of rules in the form of a global policy associated with the multimedia object OM.

The information contained in the control data DonC may be considered as a set of possibilities, or as reference possibilities for semantic data and sensitivity data, or as transformation possibilities for functionality data.

According to one embodiment, the segmentation application AS analyses a multimedia object and presents control data and segmentation proposals for the multimedia object. For example, for a text document, the control data are suggested based on word processing techniques that identify words considered sensitive, such as proper nouns or expressions making it possible to identify a person, such as an address or telephone number and associate a section of the text, called a segment, with the identified word.

Several techniques can be used to segment the multimedia object depending upon the format of the multimedia object. For example, for an "HTML" ("Hypertext Markup Language"), specific tags can be used to segment the file and associate control data with the various segments. According to another example for a file containing text, comments may be used in track changes mode. For a video file, techniques in the MPEG ("Moving Picture Experts Group") standard make it possible to associate descriptions with various segments of the video or with parts of each frame of the video. For an image file, a "JPEG" ("Joint Photographic Experts Group") or a PDF ("Portable Document Format"), techniques in the XMP ("Extensible Metadata Platform") standard make it possible to add metadata to the file.

The communication device DC is for example a personal computer or an application server.

The communication device DC comprises an execution environment EE and a control application AC comprising an analysis module ANA, an interpretation module INT, and a transformation module TRA.

The communication device DC comprises various hardware resources, such as a processor, random access memory, and storage memory.

The execution environment EE is a set of programs providing a connection between the hardware resources of the communication device DC and software applications AppL. For example, the execution environment is an operating system, a web browser, or even a middleware software component.

A software application AppL is for example a content editor, a content sharing tool, or even an email client.

In particular, the execution environment EE contains APIs ("Application Programming Interfaces") to execute basic operations on files, such as "read", "copy, "paste", "drag", "edit", "open", or "print" operations.

An API can be seen as a set of features, procedures, or classes provided by the execution environment EE, whose knowledge enables interoperability among the various software components managed by the communication device DC.

To process a multimedia object, a software application AppL interacts with the execution environment, in particular by calling upon basic operations managed by the execution environment.

If the execution environment EE is an operating system, the control application AC may be considered as an overlay of the operating system intervening in the execution of any software application.

The control application AC, and potentially the software application AppL, communicate with a vocabulary database BDV that contains definitions and user guidelines for control data, of the same type as the database associated with the segmentation application AS.

It should be considered that the control application AC intercepts all calls from a software application AppL to the execution environment EE to carry out a basic operation on a multimedia object. The analysis module ANA analyses a policy included in the control data DonC and associated with a multimedia object OM to determine transformation parameters to associate with the call based on an execution context of the call by the software application AppL.

The execution context of the call by the software application is determined based on the type of operation requested by the software application AppL. The execution context of the call by the software application may also be determined based on the name and type of the software application AppL, the type of execution environment EE, or the identity of the user of the software application. For example, the policy included in the control data DonC may define information to be considered in determining the context of the invention.

The analysis module ANA produces and associates transformation parameters ParT with the call by querying the vocabulary database.

Like the control data DonC associated with the multimedia object, the parameters may be organised into at least three categories:

- A semantic parameter ParSm describes a meaning related to a multimedia object, such as a specific topic, theme, or concept,
- A sensitivity parameter ParSb describes a level of sensitivity related to the multimedia object,
- A functionality parameter ParF describes an action requested on the multimedia object.

The ParSm and ParSb are then used to identify the segments in the multimedia object OM by verifying a match between at least one of the ParSm and ParSb parameters with at least one of the related labels in the DonSm and DonSb data. Once at least one segment has been identified, a transformation operation to be carried out on the segment can be determined based on the data DonF associated with the segment, or if there are no data DonF, based on the parameter ParF.

As an example, the control application AC produces a call configured by invoking modified basic operations such as "p-read", "p-copy", "p-paste", "p-drag", "p-edit", "p-open", or "p-print" operations, these operations making it possible to transform the multimedia object based on the transformation possibilities provided by the user in the control data DonC, before the transformed multimedia object undergoes "read", "copy", "paste", "drag", "edit", "open", or "print" operations.

The information contained in the transformation parameters ParT associated with the calls corresponds to a request made by the software application to carry out an action on the multimedia object.

Therefore, the requests made by the software application will only be executed if they match a possibility given by the user who created the multimedia object when the control data were associated with the multimedia object.

It should be considered that the transformation parameters ParT contain at least one functionality parameter ParF, and at least one semantic parameter ParSm, and one sensitivity parameter ParSb.

It may also be considered that the policy included in the control data DonC and associated with the multimedia object OM contains conditional elements making it possible to describe an execution context of the call by the software application AppL and action elements making it possible to determine transformation parameters ParT.

The interpretation module INT interprets the control data DonC associated with segments of the multimedia object OM and interprets the parameters ParT associated with a basic operation call by the software application AppL in order to determine the segments of the multimedia object meeting the conditions for being transformed. The interpretation module INT produces a transformation request ReqT indicating a transformation to be carried out for each segment of the multimedia object. This request is provided as input to the transformation module TRA.

The transformation module TRA transforms the multimedia object OM into a transformed multimedia object OMt based on the transformation request ReqT, in particular based on the functionality data in the control data DonC. For example, at least one segment of the multimedia object may be deleted or blurred, if the functionality data associated with said segment indicate this type of action to preserve the privacy of the information contained in this segment.

According to one example, the software application calls a "copy" operation on a multimedia object that is a document in which confidential sections must be deleted. The control application AC intercepts this call, and associates the following parameters ParT with the call: "high level of sensitivity" as a sensitivity parameter, and "delete" as a functionality parameter, based on the context of the call according to the policy included in the control data DonC associated with the multimedia object OM and after having consulted the vocabulary database BDV.

According to another example, if the multimedia object is associated only with sensitivity data indicating "confidential" and is not associated with any functionality data, and if the software application is a content sharing tool, the control application will authorise the software application to call the "read" operation without transforming the multimedia object, and will transform at least one segment of the multimedia object associated with the sensitivity data, for example by deleting it, if the software application calls the "print" operation.

If there are functionality data associated with the multimedia object, it is considered that the action defined by these data takes priority over an action defined in the functionality parameters associated with a basic operation call.

It should be considered that the transformed multimedia object OMt presents less information to the user than the initial multimedia object.

After transformation of the multimedia object, the transformed multimedia object OMt can be subject to the execution of conventional basic operations by request from the software application, the segments of the multimedia application considered sensitive being processed by the control application AC.

According to one embodiment, the communication terminal TC and the communication device DC are combined. In this case, the segmentation application AS and the control application AC may be combined.

With reference to FIG. 2, a method for controlling the processing of a multimedia object by a software application according to one embodiment of the invention comprises steps E1 to E4 executed within the communication system.

In step E1, a first user wishes to publish or send a multimedia object OM over the telecommunication network RT.

The segmentation application AS executed in the communication terminal associates control data DonC with the multimedia object OM, the first user being able to determine at least some of the control data.

The multimedia object OM is then sent from the communication terminal TC to a communication device DC over the telecommunication network RT.

In step E2, the communication device DC receives the multimedia object OM and a software application AppL accesses the multimedia object OM.

The software application AppL, interacting with an execution environment EE, makes a call to the latter to carry out a basic operation on the multimedia object.

The control application AC intercepts this call and analyses the control data DonC associated with the segments of the multimedia object OM.

In particular, the analysis module ANA determines transformation parameters ParT based on the context of the call according to a policy included in the control data DonC associated with the multimedia object OM. For example, according to said policy, the control application AC is based on the type of software application and the type of basic operation requested to identify the call context.

The analysis module ANA associates these transformation parameters ParT that were determined based upon the call context, with the call, the parameters ParT containing at least one functionality parameter ParF and at least one semantic parameter ParSm and one sensitivity parameter ParSb.

In step E3, the interpretation module INT of the control application AC analyses the control data DonC associated with the segments of the multimedia object OM and analyses the transformation parameters ParT associated with the call. The control application selects the segments meeting the conditions for being transformed, which is to say when they are associated with control data compatible with the transformation parameters.

According to one example, the software application calls a "copy" operation on a multimedia object that is a document in which confidential sections must be deleted. The call is associated with a sensitivity parameter ParSb describing a "high level of sensitivity" and a functionality parameter ParF describing, "delete". The multimedia object comprises a first segment associated with semantic data DonSm indicating "personal", sensitivity data DonSb indicating "high level of sensitivity", and functionality data DonF indicating the possible actions "delete, blur", and comprises second segment associated with semantic data DonSm indicating "personal", sensitivity data DonSb indicating "low level of sensitivity", and functionality data DonF indicating the possible action "make anonymous". The control application determines only the first segment as a segment to be transformed, using the sensitivity parameter ParSb matching the sensitivity data DonSb and using the functionality parameter describing an action that matches a possible action defined in the functionality data DonF.

The control application AC produces a transformation request ReqT indicating a transformation of each segment of the multimedia object, based on the control data DonC and the transformation parameters ParT. The transformation request ReqT may also be produced based on the execution context of the software application.

In step E4, the transformation module TRA of the control application AC transforms the multimedia object OM into a transformed multimedia object OMt based on the transformation request ReqT.

The transformed multimedia object OMt may then undergo a basic operation carried out by the execution environment EE.

The invention described here pertains to a method and a device for processing a multimedia object by a software application. According to one embodiment of the invention, the steps of the inventive method are determined by the instructions of a computer program incorporated into a device, such as the device DC, the program dictating the behaviour or at least one software application AppL and the control application AC. The program comprises program instructions, which when said program is loaded and executed within the device, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for controlling the processing of a multimedia object with a software application implemented within a communication device comprising the following in a control application implemented within the communication device:

Intercepting a call from the software application to an execution environment to carry out a basic operation on the multimedia object, the multimedia object being divided into segments, each associated with control data comprising at least data from among semantic data, sensitivity data, and functionality data, Associating transformation parameters comprising at least one functionality parameter and at least one semantic parameter and one sensitivity parameter with the call, based on the execution context of the call, Transforming the multimedia object into a transformed multimedia object based on the control data associated with the multimedia object and the transformation parameters associated with the call, the transformed multimedia object comprising at least one transformed segment such that the transformed multimedia object presents less information than the multimedia object and is capable of undergoing a basic operation carried out by the execution environment;

wherein the sensitivity data indicates a graduated level of sensitivity of the segment; and wherein when the sensitivity data indicates that the multimedia object is confidential, the control application transforms the multimedia object if a first basic operation is called and leaves the multimedia object untransformed if a second operation is called;

wherein the first basic operation is one of a print operation, a copy operation, a paste operation, a drag operation, and an edit operation, and wherein the second operation is one of a read operation and an open operation.

2. A method according to claim 1, wherein the semantic data define the meaning of a segment, the sensitivity data define the level of sensitivity of a segment, and the functionality data define the actions possible for the segment, and the semantic parameter describes a meaning related to the multimedia object, the sensitivity parameter describes a level of sensitivity for the multimedia object, and the functionality parameter describes an action requested on the multimedia object.

3. A method according to claim 1, wherein the execution context of the call by the software application is determined based on the type of basic operation requested by the software application.

4. A method according to claim 1, wherein the execution context of the call by the software application is also determined based on at least one element from among the elements including the name of the software application, the type of software application, the type of execution environment, and the identity of the user of the software application.

5. A method according to claim 1 wherein the transformed multimedia object comprises at least one transformed segment that is selected when it is associated with control data compatible with the transformation parameters.

6. A method according to claim 1, wherein the transformed multimedia object may comprise at least one segment that is deleted or blurred.

7. A method according to claim 1, wherein a basic operation on the multimedia object is an operation carried out by an API (Application Programming Interface).

8. A method according to claim 1, wherein a basic operation on the multimedia object is an operation from a set comprising at least read, copy, paste, drag, edit, open, and print operations.

9. A method according to claim 1, wherein the execution environment is an operating system.

10. A communication device to control the processing of a multimedia object by a software application implemented within the communication device, comprising: a processor configured to:
intercept a call from the software application to an execution environment to carry out a basic operation on the multimedia object, the multimedia object being divided into segments, each associated with control data comprising at least data from among semantic data, sensitivity data, and functionality data;
associate transformation parameters comprising at least one functionality parameter and at least one semantic parameter and one sensitivity parameter with the call, based on the execution context of the call; and
transform the multimedia object into a transformed multimedia object based on the control data associated with the multimedia object and the transformation parameters associated with the call, the transformed multimedia object comprising at least one transformed segment such that the transformed multimedia object presents less information than the multimedia object and is capable of undergoing a basic operation carried out by the execution environment;
wherein the sensitivity data indicates a graduated level of sensitivity of the segment; and
wherein the processor is further configured to, when the sensitivity data indicates that the multimedia object is confidential, transform the multimedia object if a first basic operation is called, and to leave the multimedia object untransformed if a second operation is called;
wherein the first basic operation is one of a print operation, a copy operation, a paste operation, a drag operation, and an edit operation, and wherein the second operation is one of a read operation and an open operation.

11. A non-transitory computer program product capable of being implemented within a communication device in order to control the processing of a multimedia object by a software application implemented within the communication device, said program comprising instructions which, when the program is loaded and executed within said communication device, perform the following:

Intercepting a call from the software application to an execution environment to carry out a basic operation on the multimedia object, the multimedia object being divided into segments, each associated with control data comprising at least data from among semantic data, sensitivity data, and functionality data,
Associating transformation parameters comprising at least one functionality parameter and at least one semantic parameter and one sensitivity parameter with the call, based on the execution context of the call,
Transforming the multimedia object into a transformed multimedia object based on the control data associated with the multimedia object and the transformation parameters associated with the call, the transformed multimedia object comprising at least one transformed segment such that the transformed multimedia object presents less information than the multimedia object and is capable of undergoing a basic operation carried out by the execution environment;
wherein the sensitivity data indicates a graduated level of sensitivity of the segment; and
wherein the instructions further comprise, when the sensitivity data indicates that the multimedia object is confidential, transform the multimedia object if a first basic operation is called and leaves the multimedia object untransformed if a second operation is called;
wherein the first basic operation is one of a print operation, a copy operation, a paste operation, a drag operation, and an edit operation, and wherein the second operation is one of a read operation and an open operation.

12. The method according to claim 1, wherein the transformation comprises deleting the segment when the sensitivity level is at a maximum level.

13. The communication device according to claim 10, wherein the transformation comprises deleting the segment when the sensitivity level is at a maximum level.

14. The non-transitory computer program product according to claim 11, wherein the transformation comprises deleting the segment when the sensitivity level is at a maximum level.

15. The method according to claim 1, wherein the first basic operation is a print operation and wherein the second operation is a read operation.

16. The method according to claim 15, wherein the transformation comprises deleting the confidential information when the print operation is called.

17. The communication device according to claim 10, wherein the first basic operation is a print operation and wherein the second operation is a read operation.

18. The non-transitory computer program product according to claim 11, wherein the first basic operation is a print operation and wherein the second operation is a read operation.

* * * * *